United States Patent
Rapko

[15] 3,684,779
[45] Aug. 15, 1972

[54] MALEIC/ACRYLIC/ALKENYL PHOSPHONATE TERPOLYMERS

[72] Inventor: John N. Rapko, 5905 Lojara Drive, St. Louis, Mo. 63123

[22] Filed: April 7, 1971

[21] Appl. No.: 132,233

[52] U.S. Cl..............260/78.5 R, 210/58, 252/175, 260/78.5 E, 260/80.71
[51] Int. Cl...............................................C08f 15/40
[58] Field of Search..........260/78.5 R, 78.5 E, 80.71

[56] References Cited

UNITED STATES PATENTS 2,636,027   4/1953   Coover et al. ............260/85.5
3,227,696   1/1966   Flowers et al. .........260/80.71

*Primary Examiner*—Joseph L. Schofer
*Assistant Examiner*—John Kight, III
*Attorney*—Herbert B. Roberts, Thomas N. Wallin and Neal E. Willis

[57] ABSTRACT

Maleic/acrylic/alkenyl phosphonate terpolymers are useful as sequestrants and for inhibition of deposition of metal ion precipitates from aqueous solutions.

5 Claims, No Drawings

MALEIC/ACRYLIC/ALKENYL PHOSPHONATE TERPOLYMERS

BACKGROUND OF THE INVENTION

Field of the Invention

This invention relates to novel polymeric compounds, more particularly, maleic/acrylic/alkenyl phosphonate terpolymers and to methods for inhibiting deposition of metal ion precipitates from aqueous solutions by means of these terpolymers.

Most commercial water contains alkaline earth metal cations, such as calcium, barium, magnesium, etc., and several anions such as bicarbonate, carbonate, sulfate, oxalate, phosphate, silicate, fluoride, etc. When combinations of these anions and cations are present in concentrations which exceed the solubility of their reaction products, precipitates form until their reaction solubility product concentrations are no longer exceeded. For example, when the concentrations of calcium ion and sulfate ion exceed the solubility of the calcium sulfate, a solid phase of calcium sulfate will form.

Solubility product concentrations are exceeded for various reasons, such as evaporation of the water phase, change in pH, pressure or temperature, and the introduction of additional ions which form insoluble compounds with the ions already present in the solution.

As these reaction products precipitate on the surfaces of the water carrying system, they form scale. The scale prevents effective heat transfer, interferes with fluid flow, facilitates corrosive processes, and harbors bacteria. The presence of this scale is an expensive problem in many industrial water systems, oilwells, and the like, causing delays and shutdowns for cleaning and removal.

Scale-forming compounds can be prevented from precipitating by inactivating their cations with chelating or sequestering agents, so that the solubility of their reaction products is not exceeded. Generally, this requires many times as much chelating or sequestering agent as cation, and these amounts under certain conditions are not always desirable or economical.

More than 25 years ago it was discovered that certain inorganic polyphosphates would prevent such precipitation when added in amounts less than the concentrations needed for sequestering or chelating. See, for example, Hatch and Rice, "Industrial Engineering Chemistry," vol. 31, pages 51 and 53; Reitemeier and Buehrer, "Journal of Physical Chemistry," vol. 44, No. 5, pages 535 and 536 (May 1940); Fink and Richardson U.S. Pat. No. 2,358,222; and Hatch U.S. Pat. No. 2,539,305, all of which are incorporated herein by reference. For sequestration, the mole ratio of precipitation inhibitor equivalents to scale-forming cation is usually 1:1 or greater (2:1, 3:1, etc.). These ratios are referred to as stoichiometric. Substoichiometric amounts would include all mole ratios of precipitation inhibitor equivalent to scale-forming cation that are less than the level required for sequestration; this phenomenon is known in the water treating art as the "threshold" effect. It is to be understood that the term "threshold" as utilized herein refers to the chemical and/or physical phenomenon that less than stoichiometric quantities of the particular precipitation inhibitor can effectively prevent the precipitation of various metallic ions such as calcium, iron, copper and cobalt. In other words, the "threshold" treatment of water is that technique by means of which less than stoichiometric quantities of the treating agent are added to interfere with the growth of crystal nuclei and thereby prevent the deposition of insoluble deposits.

Consequently, precipitation inhibitors which function as a threshold agent or a sequestering agent are in substantial demand.

Accordingly, it is an object of this invention to provide novel terpolymer materials useful as sequestrants or threshold agents. Another object is to provide methods of inhibiting precipitation of metal ions from aqueous solutions.

These and other objects of the invention will be better understood from the following description of the preferred embodiments.

The novel terpolymers of this invention are terpolymers of maleic monomers, acrylic monomers and alkenyl phosphonate monomers.

The maleic monomers can be maleic acid, maleic anhydride or alkyl esters or half esters thereof having one to five carbon atoms in the alkyl group. Maleic acid or maleic anhydride, particularly the anhydride, is preferred.

The acrylic monomers can be acrylic acid, alkyl (one to five carbon atoms in the alkyl group) esters of acrylic acid or mixtures thereof. Acrylic acid or methyl acrylate, particularly acrylic acid, is preferred.

The alkenyl phosphonate monomers will be compounds or mixtures of compounds represented by the formula:

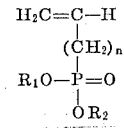

where $n$ is from 0 to 6 and $R_1$ and $R_2$ are hydrogen or an alkyl group containing one to five carbon atoms. Diethyl vinyl phosphonate or diethyl allyl phosphonate, particularly diethyl vinyl phosphonate, is preferred.

The maleic monomers will constitute from 25 to 50 percent by weight of the terpolymer.

The acrylic monomer will constitute from 30 to 74 percent by weight of the terpolymer.

The alkenyl phosphonate monomer will constitute from 1 to 20 percent by weight of the terpolymer.

The terpolymer will have an average molecular weight of from 5,000 to 50,000 as determined by intrinsic viscosity measurement.

Unless otherwise specifically indicated, the term "terpolymer" is used broadly in both the specification and claims to include anhydride, acid and neutralized forms.

The terpolymers of this invention can be prepared by conventional polymerization techniques, for example, by heating the monomeric components in desired ratios in the presence of cumene hydroperoxide. If desired, the polymer can be hydrolyzed and neutralized by heating in aqueous sodium hydroxide or other basic solutions.

It is unexpectedly found that the terpolymers of this invention function to inhibit precipitation of metal ions when used in substoichiometric concentrations. This phenomenon includes what is generally known in the art as the "threshold effect." The terpolymers are also effective sequestering agents and can be used accordingly if desired.

Although terpolymer compounds of the present invention are of general utility whenever it is desired to inhibit the precipitation of metal ions from aqueous solutions, they are especially effective in such applications as liquid soaps and shampoos, bar soaps, scouring wool cloth, cotton kier boiling, cotton dyeing, cotton bleaching, metal cleaning compounds, rubber and plastic trace metal contamination (compounding and polymerization), and pulp and paper trace metal contamination.

The amount of the terpolymers necessary to effectively inhibit precipitation varies with, inter alia, the type and amount of problem metal ions, pH conditions, temperature and the like. When using threshold amounts, the preferred weight ratio of the precipitation inhibitor to the scale forming cation salt is from about 1:1.5 to about 1:10,000. When using sequestering amounts, i.e., at least stoichiometric quantities, the preferred weight ratio is from about 1:1 to 10:1.

It is within the scope of the present invention that the terpolymers of the present invention may also be used in aqueous systems which contain inorganic or organic materials, with the proviso that such materials do not render the precipitation inhibitors substantially ineffective for their end purpose. For exemplary purposes only, water-soluble inorganic chromates such as those described in U.S. Pat. No. 3,431,217 (which is incorporated herein by reference) may be used in combination with the terpolymers. Other materials which can be used with the terpolymers include, for example, surface active agents and corrosion inhibitors such as those described in Corrosion Inhibitors, by Beegman, published by MacMillan in 1963 and which is incorporated herein by reference. Furthermore, other precipitation inhibitors such as amino tri(methylene phosphonic acid) may be used in combination with the terpolymers of the present invention. For exemplary purposes only, these other precipitation inhibitors are described in U.S. Pat. No. 2,970,959, U.S. Pat. No. 3,234,124, U.S. Pat. No. 3,336,221, U.S. Pat. No. 3,400,078, U.S. Pat. No. 3,400,148, U.S. Pat. No. 3,451,939 and U.S. Pat. No. 3,462,365, all of which publications are incorporated herein by reference.

The following examples are included to illustrate the practice of the present invention and the advantages provided thereby but are not to be considered limited. Unless otherwise specified, all parts are parts by weight and all temperatures are in degrees centigrade.

EXAMPLE I

A glass reaction vessel fitted with a mechanical stirrer and a reflux condenser is charged with 500 ml benzene; 0.6 mole maleic anhydride; 0.6 mole acrylic acid; and 0.05 mole diethyl vinyl phosphonate. The mixture is heated to reflux under nitrogen atmosphere and 5 ml cumene hydroperoxide added with stirring. Refluxing is continued for 4 hours after which the mixture is cooled to 50°, filtered, washed with benzene and dried. The polymer is hydrolyzed and converted to the sodium salt by dissolving in $H_2O$, adding a slight excess of 50 percent NaOH solution and heating at 50°–55° for 4 hours to facilitate hydrolysis of the phosphonate ester groups. The resulting solution is dried to yield 37 gms of the sodium salt of the terpolymer.

Nuclear magnetic resonance spectral analysis indicates that the product is a terpolymer as opposed to a mixture of monomeric components.

The procedure of Example I is repeated with the exception that ethylene dichloride is substituted for the benzene solvent and diethyl allyl phosphonate is substituted for the diethyl vinyl phosphonate. Twenty-eight grams of terpolymer is recovered.

EXAMPLE III

Sequestration characteristics of the terpolymers produced via the procedures of Examples I and II above are determined by dissolving 1 gm terpolymer in 50 ml distilled water. To this solution 10 ml of 2 percent $Na_2CO_3$ is added, the pH adjusted to 10, and the solution diluted to 100 ml with distilled water. The sample is titrated to a permanent turbidity with 0.25 molar calcium acetate solution.

The grams $Ca^{++}$ sequestered per 100 gms sample is calculated as ml calcium acetate solution/sample weight.

The terpolymer of Examples I and II each sequester about 19.5 gms $Ca^{++}$ per 100 gm terpolymer.

EXAMPLE IV

The terpolymer of Example I is mixed at 25° with 250 ml of water containing $CaCl_2$. To the resultant mixture is added $Na_2CO_3$. The amounts of $CaCl_2$, $CaCO_3$ and terpolymer used are sufficient to provide 150 ppm of $CaCo_3$ and 100 ppm terpolymer. It is observed that this less than stoichiometric quantity (threshold amount) of terpolymer effects a substantially clear solution for a period of at least 24 hours. Stating the results in a different manner, the threshold amount of terpolymer is effective in providing a clear solution without precipitation which contains substantially greater quantities of $CaCO_3$ than normally required to produce deposition of scale.

The foregoing examples are presented for the purpose of illustration and not limitation. Various modifications which will be apparent to those skilled in the art are intended to be comprehended as within the scope of this invention.

What is claimed is:

1. A terpolymer of maleic monomers, acrylic monomers and alkenyl phosphonate monomers, said maleic monomers being selected from the group consisting of maleic acid, maleic anhydride, alkyl esters and half esters of maleic anhydride and maleic acid wherein the alkyl group contains from one to five carbon atoms and mixtures thereof and constituting from 25 to 50 percent by weight of the terpolymer, said acrylic monomers being selected from the group consisting of acrylic acid, alkyl esters of an acrylic acid wherein the alkyl group contains one to five carbon atoms, and mixtures thereof and constituting from 30 to 74 percent by weight of the terpolymer, said alkenyl phosphonate component being selected from the group consisting of compounds and mixtures of compounds represented by the formula:

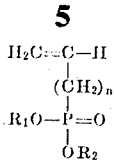

wherein $n$ is from 0 to 6 and $R_1$ and $R_2$ are selected from the group consisting of hydrogen and alkyl groups containing from one to five carbon atoms and constituting from 1 to 20 percent by weight of the terpolymer, the average molecular weight of the terpolymer being from 5,000 to 50,000.

2. The terpolymer of claim 1 wherein said maleic monomer is maleic anhydride and said acrylic monomer is acrylic acid.

3. The terpolymer of claim 2 wherein said alkenyl phosphonate monomer is diethyl vinyl phosphonate.

4. The terpolymer of claim 2 wherein said alkenyl phosphonate monomer is diethyl allyl phosphonate.

5. The terpolymer of claim 2 in the form of the sodium salt.

* * * * *

PO-1050
(5/69)

UNITED STATES PATENT OFFICE
CERTIFICATE OF CORRECTION

Patent No. 3,684,779      Dated August 15, 1972

Inventor(s) John N. Rapko

It is certified that error appears in the above-identified patent and that said Letters Patent are hereby corrected as shown below:

In Column 4, between lines 6 and 7, the following should be inserted---EXAMPLE II---.

Signed and sealed this 9th day of January 1973.

(SEAL)
Attest:

EDWARD M. FLETCHER, JR.                ROBERT GOTTSCHALK
Attesting Officer                      Commissioner of Patents